(12) United States Patent
Srichai et al.

(10) Patent No.: US 10,571,165 B2
(45) Date of Patent: Feb. 25, 2020

(54) SORPTION SYSTEM IN A TRANSPORT REFRIGERATION SYSTEM

(71) Applicant: THERMO KING CORPORATION, Minneapolis, MN (US)

(72) Inventors: Panayu Robert Srichai, Minneapolis, MN (US); Robert Michael Lattin, Minneapolis, MN (US); Vladimir Sulc, Minnetonka, MN (US); Jeffrey B. Berge, Eden Prairie, MN (US); Clay A. Rohrer, Belle, MO (US); Don Shapiro, St. Louis, MO (US)

(73) Assignee: Thermo King Corporation, Minneapolis, MN (US)

( * ) Notice: Subject to any disclaimer, the term of this patent is extended or adjusted under 35 U.S.C. 154(b) by 101 days.

(21) Appl. No.: 15/578,089

(22) PCT Filed: May 26, 2016

(86) PCT No.: PCT/US2016/034335
§ 371 (c)(1),
(2) Date: Nov. 29, 2017

(87) PCT Pub. No.: WO2016/196198
PCT Pub. Date: Dec. 8, 2016

(65) Prior Publication Data
US 2018/0149393 A1 May 31, 2018

Related U.S. Application Data

(60) Provisional application No. 62/168,344, filed on May 29, 2015.

(51) Int. Cl.
*F25B 25/02* (2006.01)
*F25B 41/04* (2006.01)
(Continued)

(52) U.S. Cl.
CPC ............. *F25B 25/02* (2013.01); *F01N 5/02* (2013.01); *F25B 17/08* (2013.01); *F25B 39/00* (2013.01);
(Continued)

(58) Field of Classification Search
CPC ........ F25B 25/02; F25B 15/006; F25B 27/02; F25B 27/007; F25B 7/00; F01N 5/02;
(Continued)

(56) References Cited

U.S. PATENT DOCUMENTS 2,118,739 A   5/1938   Schulman
2,592,712 A   4/1952   Knoy
(Continued)

FOREIGN PATENT DOCUMENTS

JP   07146029      6/1995
JP   2007203795   8/2007
WO   2014082069   5/2014

OTHER PUBLICATIONS

International Search Report and Written Opinion issued in International Application No. PCT/US2016/034335 dated Sep. 7, 2016 (14 pages).

*Primary Examiner* — Frantz F Jules
*Assistant Examiner* — Lionel Nouketcha
(74) *Attorney, Agent, or Firm* — Hamre, Schumann, Mueller & Larson, P.C.

(57) ABSTRACT

A transport refrigeration system (TRS) and method of operating a TRS having a sorption subsystem are disclosed. The TRS includes a refrigeration subsystem and a sorption subsystem. The refrigeration subsystem includes a refrigerant, a compressor, a refrigerant condenser, a refrigerant expansion device, and a refrigerant evaporator in fluid communication such that the refrigerant can flow therethrough. The sorption subsystem includes a heat transfer (Continued)

fluid, a heat source, a boiler, a sorption condenser, a sorption expansion valve, a sorption evaporator, and a pump in fluid communication such that the heat transfer fluid can flow therethrough. The sorption evaporator is in thermal communication with the refrigeration subsystem.

12 Claims, 5 Drawing Sheets

(51) Int. Cl.

| | |
|---|---|
| *F25D 11/00* | (2006.01) |
| *F01N 5/02* | (2006.01) |
| *F25D 11/02* | (2006.01) |
| *F25B 17/08* | (2006.01) |
| *F25B 39/00* | (2006.01) |
| *F25B 47/02* | (2006.01) |
| *F25B 41/00* | (2006.01) |
| *F25B 15/02* | (2006.01) |
| *F25B 27/02* | (2006.01) |
| *F25B 40/02* | (2006.01) |
| *F25B 27/00* | (2006.01) |
| *B60H 1/32* | (2006.01) |
| *F25B 39/02* | (2006.01) |
| *F25B 39/04* | (2006.01) |

(52) U.S. Cl.
CPC ............ *F25B 41/04* (2013.01); *F25D 11/003* (2013.01); *F25D 11/027* (2013.01); *B60H 1/3201* (2013.01); *F01N 2240/02* (2013.01); *F01N 2590/00* (2013.01); *F25B 15/02* (2013.01); *F25B 27/007* (2013.01); *F25B 27/02* (2013.01); *F25B 39/026* (2013.01); *F25B 39/04* (2013.01); *F25B 40/02* (2013.01); *F25B 41/003* (2013.01); *F25B 47/022* (2013.01); *F25D 11/025* (2013.01); *Y02T 10/16* (2013.01)

(58) Field of Classification Search
CPC .... F25D 11/003; F25D 11/025; F25D 11/027; B60H 1/3201
See application file for complete search history.

(56) References Cited

U.S. PATENT DOCUMENTS

| | | | |
|---|---|---|---|
| 2,990,694 | A | 7/1961 | Kummerlowe et al. |
| 3,301,000 | A | 1/1967 | Holbay |
| 4,285,208 | A | 8/1981 | Takeshita et al. |
| 4,341,088 | A | 7/1982 | Mei et al. |
| 6,321,552 | B1 * | 11/2001 | Frederiksen ............ B60H 1/32 123/41.23 |
| 7,765,823 | B2 | 8/2010 | Shiflett et al. |
| 2005/0016193 | A1 | 1/2005 | Tarasinski et al. |
| 2006/0107674 | A1 | 5/2006 | Sharma et al. |
| 2012/0227427 | A1 | 9/2012 | Liu et al. |
| 2012/0318008 | A1 | 12/2012 | Liu et al. |
| 2014/0060089 | A1 | 3/2014 | Erbs |

* cited by examiner

SORPTION SYSTEM IN A TRANSPORT REFRIGERATION SYSTEM

FIELD

This disclosure relates generally to a transport refrigeration system (TRS). More specifically, this disclosure relates to systems and methods for subcooling liquid refrigerant in the TRS.

BACKGROUND

A transport refrigeration system (TRS) is generally used to control one or more environmental conditions such as, but not limited to, temperature, air quality, and/or humidity of a refrigerated transport unit. Examples of refrigerated transport units include, but are not limited to, a container on a flat car, an intermodal container, a truck, a boxcar, or other similar transport units. A refrigerated transport unit is commonly used to transport perishable items such as produce, frozen foods, and meat products. Generally, the refrigerated transport unit includes a transport unit and a transport refrigeration unit (TRU) that is attached to the transport unit to control one or more environmental conditions (e.g., temperature, humidity, etc.) of a particular space (e.g., a cargo space, a passenger space, etc.) (generally referred to as a "conditioned space"). The TRU can include, without limitation, a compressor, a refrigerant condenser, a refrigerant expansion valve, a refrigerant evaporator, and fans or blowers to control the heat exchange between the air inside the conditioned space and the ambient air outside of the refrigerated transport unit.

SUMMARY

This disclosure relates generally to a transport refrigeration system (TRS). More specifically, this disclosure relates to systems and methods for subcooling liquid refrigerant in the TRS.

A TRS is disclosed. The TRS includes a refrigeration subsystem and a sorption subsystem. The refrigeration subsystem includes a refrigerant, a compressor, a refrigerant condenser, a refrigerant expansion device, and a refrigerant evaporator in fluid communication such that the refrigerant can flow therethrough. The sorption subsystem includes a heat transfer fluid, a heat source, a boiler, a sorption condenser, a sorption expansion valve, a sorption evaporator, and a pump in fluid communication such that the heat transfer fluid can flow therethrough. The sorption evaporator is in thermal communication with the refrigeration subsystem.

A TRS for a transport unit including a plurality of controlled spaces is disclosed. The TRS includes a refrigeration subsystem and a sorption subsystem. The refrigeration subsystem includes a refrigerant, a compressor, a refrigerant condenser, a refrigerant expansion device, and a refrigerant evaporator in fluid communication such that the refrigerant can flow therethrough. The refrigerant evaporator is in thermal communication with a first of the plurality of conditioned spaces. The sorption subsystem includes a heat transfer fluid, a heat source, a boiler, a sorption condenser, a sorption expansion valve, a sorption evaporator, and a pump in fluid communication such that the heat transfer fluid can flow therethrough. The sorption evaporator is in thermal communication with a second of the plurality of controlled spaces.

A method of subcooling a refrigerant in a refrigeration subsystem of a TRS is disclosed. The method includes directing a refrigerant through the refrigeration subsystem. The method further includes directing a heat transfer fluid through a sorption subsystem, wherein a sorption evaporator of the sorption subsystem is in thermal communication with the refrigeration subsystem.

A method of operating a TRS in a transport unit including a plurality of controlled spaces is disclosed. The method includes directing a refrigerant through the refrigeration subsystem, wherein the refrigerant evaporator of the refrigeration subsystem is in thermal communication with a first of the plurality of controlled spaces. The method further includes directing a heat transfer fluid through a sorption subsystem, wherein a sorption evaporator of the sorption subsystem is in thermal communication with a second of the plurality of controlled spaces.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

This disclosure relates generally to a transport refrigeration system (TRS). More specifically, this disclosure relates to systems and methods for subcooling liquid refrigerant in the TRS.

In a typical TRS, a suction-liquid heat exchanger can be included to provide subcooling to the refrigerant leaving the condenser prior to reaching a refrigerant expansion device. The subcooling provided by the suction-liquid heat exchanger generally can cause the TRS to be more efficient and have a higher capacity.

The suction-liquid heat exchanger can also cause superheating of the refrigerant returning from the evaporator to the compressor. The higher temperature refrigerant on the suction side of the compressor can cause an increase in a discharge temperature of the refrigerant being discharged from the compressor. The increase in the discharge temperature can cause failure of the compressor if not appropriately controlled.

In some embodiments, the suction-liquid heat exchanger can be removed from the refrigeration subsystem. A sorption subsystem can be added such that subcooling of the refrigerant in the refrigeration subsystem is still possible. In some embodiments, the suction-liquid heat exchanger can be kept in the refrigeration subsystem and a sorption subsystem can be added to control another space (e.g., in a multi-Zone refrigerated transport unit).

A sorption subsystem, as used inn this specification, refers to both an absorption subsystem and an adsorption subsystem. It is to be appreciated that the embodiments described herein can be implemented by addition of an adsorption subsystem or an absorption subsystem, unless expressly stated otherwise. Accordingly, to simplify the description, the embodiments will be referred to as including a sorption subsystem.

A "refrigerated transport unit" includes, for example, a transport unit having a TRS. A refrigerated transport unit can be used to transport perishable items such as, but not limited to, produce, frozen foods, and meat products. A refrigerated transport unit generally includes a TRS and a transport unit. A "transport unit" includes, for example, a container on a flat car, an intermodal container, truck, a boxcar, or other similar transport unit.

A "transport refrigeration system" (TRS) includes, for example, a refrigeration system for controlling the refrigeration of an interior space of a refrigerated transport unit. The TRS may be a vapor-compressor type refrigeration system, a thermal accumulator type system, or any other suitable refrigeration system that can use refrigerant, cold plate technology, or the like.

A TRS is generally used to control one or more environmental conditions such as, but not limited to, temperature, humidity, and/or air quality of a refrigerated transport unit. As disclosed in this specification, a TRS can include a transport refrigeration unit (TRU) which is attached to a transport unit to control one or more environmental conditions (e.g., temperature, humidity, air quality, etc.) of an interior space of the refrigerated transport unit. The TRU can include, without limitation, a compressor, a refrigerant condenser, a refrigerant expansion valve, a refrigerant evaporator, and one or more fans or blowers to control the heat exchange between the air within the interior space and the ambient air outside of the refrigerated transport unit.

Embodiments of this disclosure may be used in any suitable environmentally controlled transport apparatus, such as, but not limited to, a shipboard container, an air cargo cabin, and an over the road truck cabin.

Figure 1:
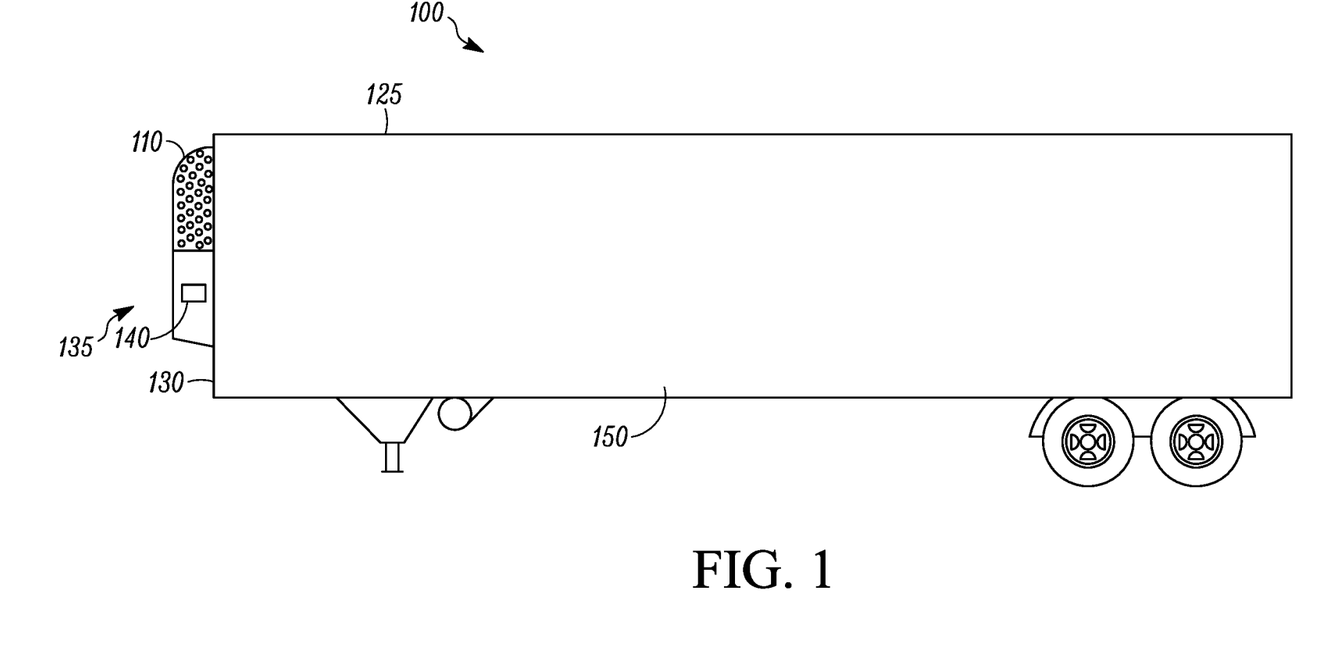
FIG. 1 illustrates a side view of a refrigerated transport unit, according to some embodiments.

FIG. 1 illustrates a side view of a TRS 100 for a transport unit 125, according to some embodiments. The illustrated transport unit 125 is a trailer-type transport unit. Embodiments as described in this specification can be used with other types of transport units. For example, the transport unit 125 can represent a container (e.g., a container on a flat car, an intermodal container, etc.), a truck, a boxcar, or other similar type of transport unit that includes an interior space.

The TRS 100 is configured to control one or more environmental conditions such as, but not limited to, temperature, humidity, and/or air quality of an interior space 150 of the transport unit 125. In some embodiments, the interior space 150 can alternatively be referred to as the conditioned space 150, the cargo space 150, the environmentally controlled space 150, or the like. In particular, the TRS 100 is configured to transfer heat between the air inside the interior space 150 and the ambient air outside of the transport unit 125.

The interior space 150 can include one or more partitions or internal walls (not shown) for at least partially dividing the interior space 150 into a plurality of zones or compartments, according to some embodiments. It is to be appreciated that the interior space 150 may be divided into any number of zones and in any configuration that is suitable for refrigeration of the different zones. In some examples, each of the zones can have a set point temperature that is the same or different from one another.

The TRS 100 includes a transport refrigeration unit (TRU) 110. The TRU 110 is provided on a front wall 130 of the transport unit 125. The TRU 110 can include an internal combustion engine (as shown and described in accordance with FIGS. 2 and 4 below) that provides mechanical power directly to a component (e.g., a compressor, etc.) of the TRS 100. In some embodiments, the engine of the TRU 110 can provide power directly to an alternator (not shown), which can be used to power the component. In such embodiments, the TRU 110 can include an electric drive motor that provides mechanical power directly to the component (e.g., a compressor, etc.) of the TRS 100. In some embodiments, one or more of the components (e.g., a compressor, one or more fans, one or more blowers, a TRS Controller, one or more flow control devices, etc.) of the TRS 100 can be powered by an electric power source (e.g., a generator, an alternator, a fuel cell, a battery, etc.)

The TRU 110 includes a programmable TRS Controller 135 that includes a single integrated control unit 140. It is to be appreciated that, in some embodiments, The TRS controller 135 may include a distributed network of TRS control elements (not shown). The number of distributed control elements in a given network can depend upon the particular application of the principles described in this specification. The TRS Controller 135 can include a processor, a memory, a clock, and an input/output (I/O) interface (not shown). The TRS Controller 135 can include fewer or additional components.

The TRU 110 also includes a heat transfer circuit (not shown in FIG. 1, see FIGS. 2-5). Generally, the TRS Controller 135 is configured to control a heat transfer cycle (e.g., controlling the heat transfer circuit of the TRU 110) of the TRS 100. In one example, the TRS Controller 135 can control the heat transfer cycle of the TRS 100 to obtain various operating conditions (e.g., temperature, humidity, air quality etc.) of the interior space 150.

Figure 2:
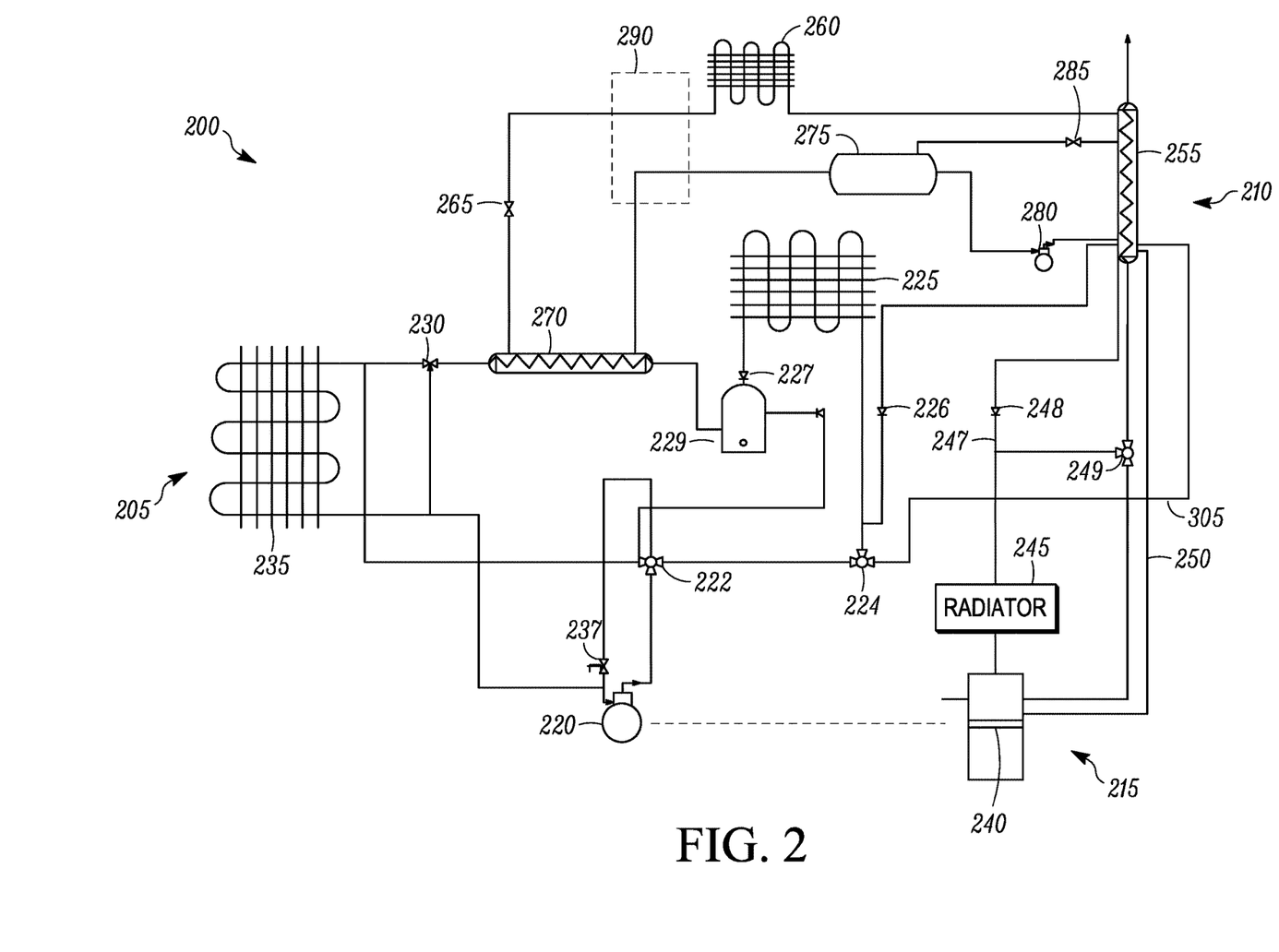
FIG. 2 illustrates a schematic diagram of a transport refrigeration system (TRS) including a sorption subsystem and an internal combustion engine, according to some embodiments.
Figure 4:
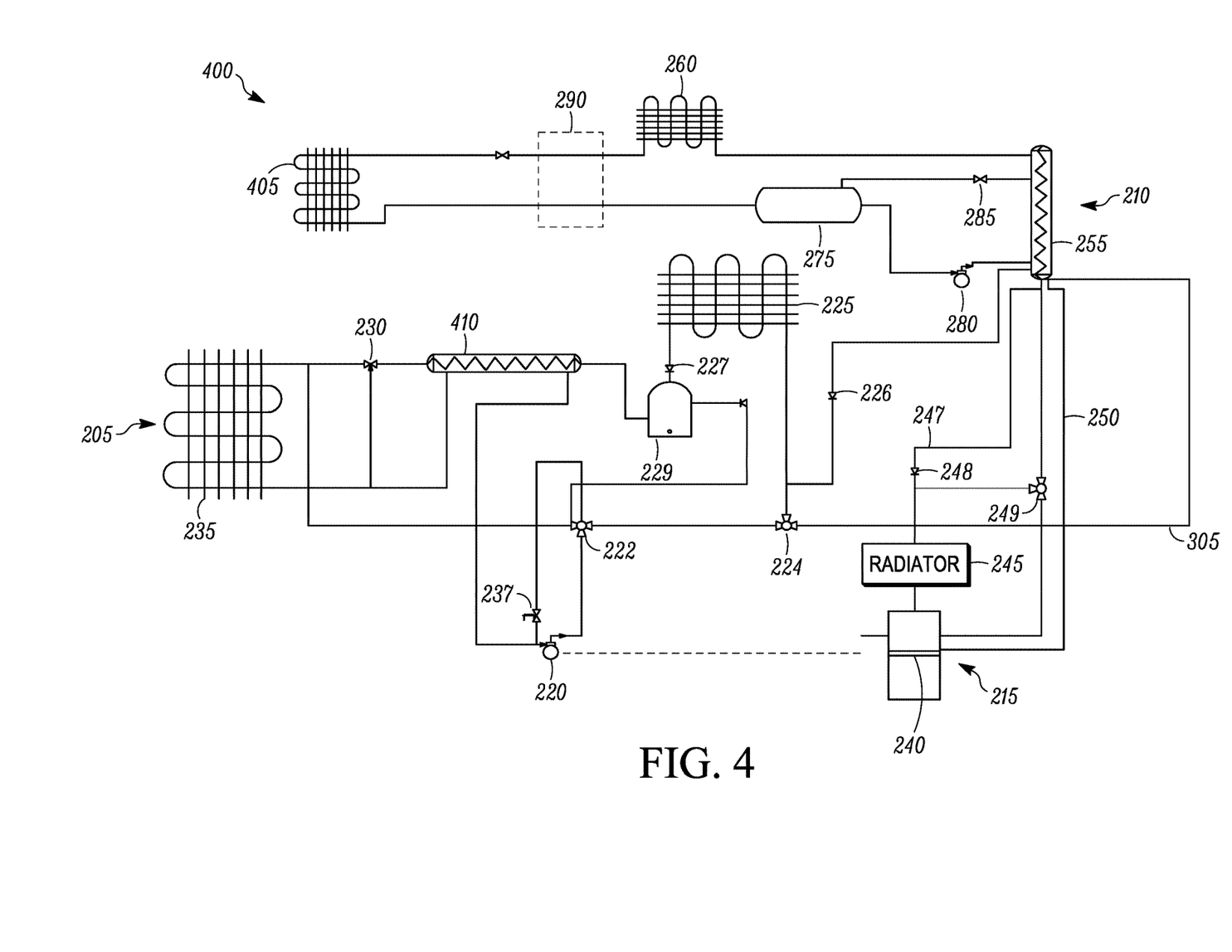
FIG. 4 illustrates a schematic diagram of a TRS including sorption subsystem and an internal combustion engine, according to some embodiments.

The TRS 100 includes an internal combustion engine, according to some embodiments (e.g., an internal combustion engine 240 shown in FIGS. 2 and 4). In some embodiments, the internal combustion engine can generally include a cooling system (e.g., water or liquid coolant system), an oil lubrication system, and an electrical system. Also, an air filtration system can be provided to filter air directed into a combustion chamber of the engine. In some embodiments, the engine is not specifically configured for the FRS 100, but can be a non-industrial internal combustion engine, such as an automotive internal combustion engine.

FIG. 2 illustrates a schematic diagram of a TRS 200, according to some embodiments. The TRS 200 can generally be configured to provide heating and/or cooling to an interior space (e.g., the interior space 150 of FIG. 1) of a transport unit (e.g., the transport unit 125 of FIG. 1). The TRS 200 generally includes a refrigeration subsystem 205, a sorption subsystem 210, and an engine system 215. The refrigeration subsystem 205 can, for example, be a vapor-compression system which functions according to principles known in the art. The sorption subsystem 210 can, in some embodiments, subcool a liquid refrigerant of the refrigeration subsystem 205. Subcooling the liquid refrigerant can, in some embodiments, increase the efficiency of the refrigeration subsystem 205. The engine system 215 can provide mechanical power directly to one or more components of the refrigeration subsystem 205, according to some embodiments. In some embodiments, the sorption subsystem 210 can be included in place of a suction-liquid heat exchanger system. In some embodiments, the sorption subsystem 210 can be included in addition to a suction-liquid heat exchanger.

The refrigeration subsystem 205 generally includes a compressor 220, a refrigerant condenser 225, a receiver tank 229, a refrigerant expansion device 230, and a refrigerant evaporator 235. It is to be appreciated that the refrigeration subsystem 205 can include one or more additional components. For example, the refrigeration subsystem 205 includes a plurality of flow control devices (e.g., a flow control device 222, a flow control device 224, a flow control device 227, and a flow control device 237). Further, the refrigeration subsystem 205 can include one or more fans or blowers (not shown) for exchanging air with the interior space of the transport unit, forcing air over the refrigerant condenser 225, and the like. The flow control device 222 can be a three-way valve, in some embodiments. The flow control device 222, in combination with the flow control device 237, can generally control whether the refrigeration subsystem 205 is operating in a heating/defrost mode, or a cooling mode. The flow control device 224 can, for example, be a three-way valve, in some embodiments. The flow control device 224 can generally control whether a portion of refrigerant is in a heat exchange relationship with a component (e.g., boiler 255) of the sorption subsystem 210. The flow control device 227 can, for example, be a check valve that is configured to prevent refrigerant exiting the refrigerant condenser 225 from flowing back into the refrigerant condenser 225.

The sorption subsystem 210 generally includes a boiler 255, a sorption condenser 260, a sorption expansion device 265, a sorption evaporator 270, an absorber 275, and a pump 280. It is to be appreciated that the sorption subsystem 210 can include one or more additional components. For example, the sorption subsystem 210 includes a flow control device 285. In some embodiments, the sorption subsystem 210 can optionally include an additional heat exchanger 290.

The refrigeration subsystem 205 and the sorption subsystem 210 are independent heat transfer circuits. At least a portion, however, of the heat transfer circuit for the refrigeration subsystem 205 is in thermal communication with a portion of the heat transfer circuit for the sorption subsystem 210. As illustrated, in some embodiments, the portion of the sorption subsystem 210 that is in thermal communication with the refrigeration subsystem is the sorption evaporator 270. This point of thermal communication is selected so that it is disposed between the receiver tank 229 and the refrigerant expansion device 230 of the refrigeration subsystem 205. This location is selected as it can provide additional subcooling to the refrigerant prior to the refrigerant reaching the refrigerant expansion device 230. In some embodiments, this location is selected and can provide the largest increase in efficiency to the refrigeration subsystem 205.

In some embodiments, the sorption subsystem 210 can also be in thermal communication with the refrigeration subsystem 205 to receive heat from the condenser 225. In such embodiments, the sorption subsystem 210 is configured such that a refrigerant of the refrigeration subsystem 205 can be a heat source for the sorption subsystem 210. Accordingly, in the TRS 200, a discharge line 305 of the refrigeration subsystem 205 that permits flow of the refrigerant for the refrigeration subsystem 205 from the flow control devices 222 and 224 to the refrigerant condenser 225 is in thermal communication with the boiler 255 of the sorption subsystem 210. In such embodiments, the flow control device 224 can be used to control a flow of the refrigerant to the boiler 255. In such embodiments, a flow control device 226 (e.g., a check valve) that is configured to prevent refrigerant from flowing back toward the boiler 255 may be included. This heat exchange relationship with the boiler 255 can provide an additional heat source to the sorption subsystem 210.

The engine system 215 generally includes an internal combustion engine 240, a radiator 245, a coolant line 247, and an exhaust line 250. Heat from the coolant system and from the exhaust system (not shown) of the engine system 215 can be provided to the boiler 255 via the coolant line 247 and the exhaust line 250. In some embodiments, either the radiator 245 or the exhaust line 250 can be in thermal communication with the boiler 255, but not both. In some embodiments, both the radiator 245 and the exhaust line 250 can be in thermal communication with the boiler 255. In some embodiments, a flow control device 249 can be included in the coolant line 247 to control an amount of coolant provided to the boiler 255. The coolant line 247 may also include a flow control device 248 to prevent fluid from flowing from the radiator 245 back toward the boiler 255.

The boiler 255 can include two stages, according to some embodiments. In such embodiments, the coolant line 247 can be in thermal communication with a first stage, and the exhaust line 250 can be in thermal communication with a second stage. Generally, the heat source (e.g., the coolant line 247 or the exhaust line 250) with the lesser amount of heat to reject can be in thermal communication with the first stage of the boiler 255 and the heat source (e.g., coolant line 247 or exhaust line 250) with the greater amount of heat to reject can be in thermal communication with the second stage of the boiler 255.

In some embodiments, the boiler 255 can include three stages. In such embodiments, the coolant line 247 can be in thermal communication with a first stage, refrigerant from the refrigeration subsystem 205 (e.g., heat from the condenser 225) can be provided to a second stage, and the exhaust line 250 can be in thermal communication with a third stage. Generally, the heat source with the lesser amount of heat to reject can be in thermal communication with the first stage of the boiler 255, the heat source with an intermediate amount of heat to reject can be in thermal communication with the second stage of the boiler 255, and the heat source with a greater amount of heat to reject can be in thermal communication with the third stage of the boiler 255.

The stages of the boiler 255 can refer to separate heat sources for exchanging heat with the sorption subsystem 210. For example, a stage can represent a particular heat exchange relationship. In this manner, the boiler 255 can be in a heat exchange relationship with a plurality of heat sources. As a result, heat sources which may otherwise be considered waste heat (e.g., exhaust, engine coolant, etc.), can be utilized in the sorption subsystem 210. It will be appreciated that each stage may be a particular heat exchanger sequentially exchanging heat with the boiler 255.

The sorption subsystem 210 includes a heat transfer fluid flowing therethrough. Examples of the heat transfer fluid for the sorption subsystem include, but are not limited to, a mixture of water and ammonia, lithium-bromide, or the like. It is to be appreciated that the heat transfer fluid for the sorption subsystem 210 and the refrigerant for the refrigeration subsystem 205 can be the same fluid in some embodiments, or different fluids in other embodiments.

The heat from the coolant line 247 and the exhaust line 250 can change the heat transfer fluid passing through the boiler into a gaseous state. The heat transfer fluid leaving the boiler is provided to the sorption condenser 260 where it can be transformed into a liquid state. The liquid heat transfer fluid flows through the sorption expansion device 265 and is provided to the sorption evaporator 270. The liquid heat transfer fluid passing through the sorption evaporator 270 is in thermal communication with the refrigerant of the refrigeration subsystem 205. The refrigerant of the refrigeration subsystem 205 can reject heat to the heat transfer fluid of the sorption subsystem 210, thereby subcooling the refrigerant of the refrigeration subsystem 205 and changing the liquid heat transfer fluid of the sorption subsystem to a gaseous state. The gaseous heat transfer fluid flows through the absorber 275, where a liquid portion of the heat transfer fluid and a gaseous portion of the heat transfer fluid can be separated. The liquid portion flows to the pump 280, where it is returned to the boiler 255. The gaseous portion can flow through the flow control device 285, which can control how much is returned to a downstream location of the boiler 255.

It is to be appreciated that the sorption subsystem 210 can generally provide subcooling to the refrigerant of the refrigeration subsystem 205 when the engine system 215 is enabled.

Figure 3:
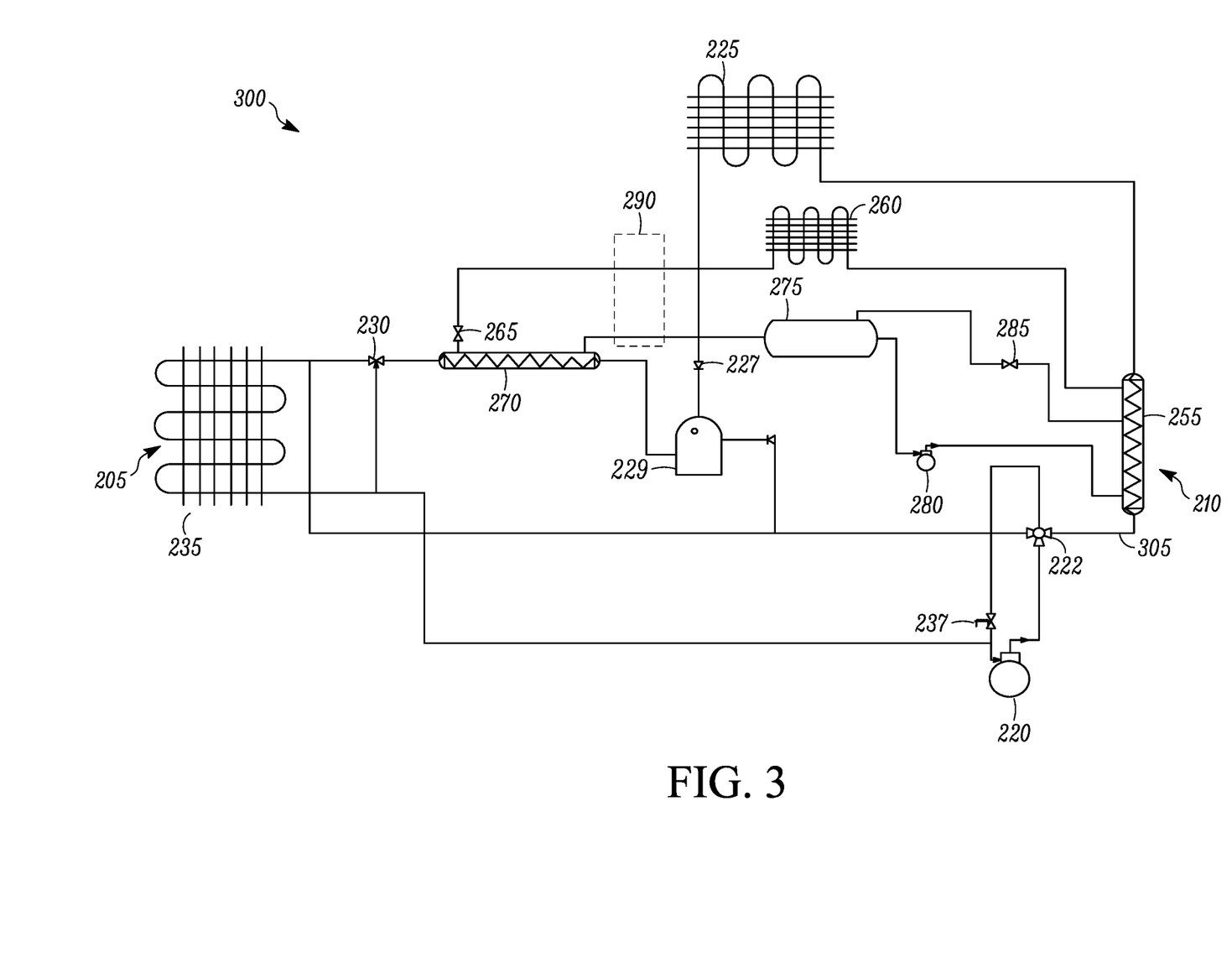
FIG. 3 illustrates a schematic diagram of a TRS including a sorption subsystem without an internal combustion engine, according to some embodiments.

FIG. 3 illustrates a schematic diagram of a TRS 300, according to some embodiments. Aspects of the TRS 300 can be the same as or similar to aspects of the TRS 200 of FIG. 2. Aspects which have previously been described will not be described in additional detail in order to simplify this specification. The TRS 300 can generally be configured to provide heating and/or cooling to an interior space (e.g., the interior space 150 of FIG. 1) of a transport unit (e.g., the transport unit 125 of FIG. 1). The TRS 300 generally includes a refrigeration subsystem 205 and a sorption subsystem 210. The TRS 300 generally does not include an engine system (e.g., the engine system 215 of FIG. 2) in thermal communication with the sorption subsystem 210. It is to be appreciated that the TRS 300 can, for example, include an electric drive motor for providing mechanical power to the compressor 220. In some embodiments, the TRS 300 can include an engine system such as the engine system 215 but that is not configured to be in thermal communication with the sorption subsystem 210. In some embodiments, one or more of the components (e.g., a compressor, one or more fans, one or more blowers, a TRS Controller, one or more flow control devices, etc.) of the TRS 200 can be powered by an electric power source (e.g., a generator, an alternator, a fuel cell, a battery, etc.)

The sorption subsystem 210 is configured such that a refrigerant of the refrigeration subsystem 205 is the heat source for the sorption subsystem 210. Accordingly, in the TRS 300, a discharge line 305 of the refrigeration subsystem 205 that permits flow of the refrigerant for the refrigeration subsystem 205 from the flow control device 222 to the refrigerant condenser 225 is in thermal communication with the boiler 255 of the sorption subsystem 210. Similar to the TRS 200, subcooling of the refrigerant in the refrigeration subsystem 205 is possible. In some embodiments, this can occur without a suction-liquid heat exchanger and accordingly, without constraints on compressor discharge temperature which can be caused by the suction-liquid heat exchanger.

FIG. 4 illustrates a schematic diagram of a TRS 400, according to some embodiments. Aspects of the TRS 400 can be the same as or similar to aspects of the TRS 200 of FIG. 2 and the TRS 300 of FIG. 3. Aspects which have previously been described will not be described in additional detail in order to simplify this specification. The TRS 400 can generally be configured to provide heating and/or cooling to an interior space (e.g., the interior space 150 of FIG. 1) of a transport unit (e.g., the transport unit 125 of FIG. 1). The TRS 400 generally includes a refrigeration subsystem 205, a sorption subsystem 210, and an engine system 215.

The TRS 400 can be configured for use in a transport unit that includes a plurality of zones (e.g., a multi-temperature transport unit as described above in accordance with FIG. 1). Accordingly, the sorption subsystem 210 is not in thermal communication with the refrigeration subsystem 205, but functions as a refrigeration subsystem for at least one of the plurality of zones, while the refrigeration subsystem 205 serves as the refrigeration subsystem for another of the plurality of zones. Accordingly, the sorption subsystem 210 additionally includes an evaporator 405. The evaporator 405 functions similarly to the refrigerant evaporator 235 in the refrigeration subsystem 205. The sorption subsystem 210 of the TRS 400 generally may have a cooling capacity that is different from the refrigeration subsystem 205. Accordingly, the zone which is controlled by the sorption subsystem 210 should be appropriately selected such that the sorption subsystem 210 can meet the cooling requirements for the zone. It is to be appreciated that the sorption subsystem 210 can generally operate when the engine system 215 is enabled. Accordingly, the sorption subsystem 210 may be limited to cooling its zone when the engine system 215 is enabled.

The TRS 400 also includes a suction-liquid heat exchanger 410. The suction-liquid heat exchanger 410 generally operates according to principles known in the art.

Figure 5:
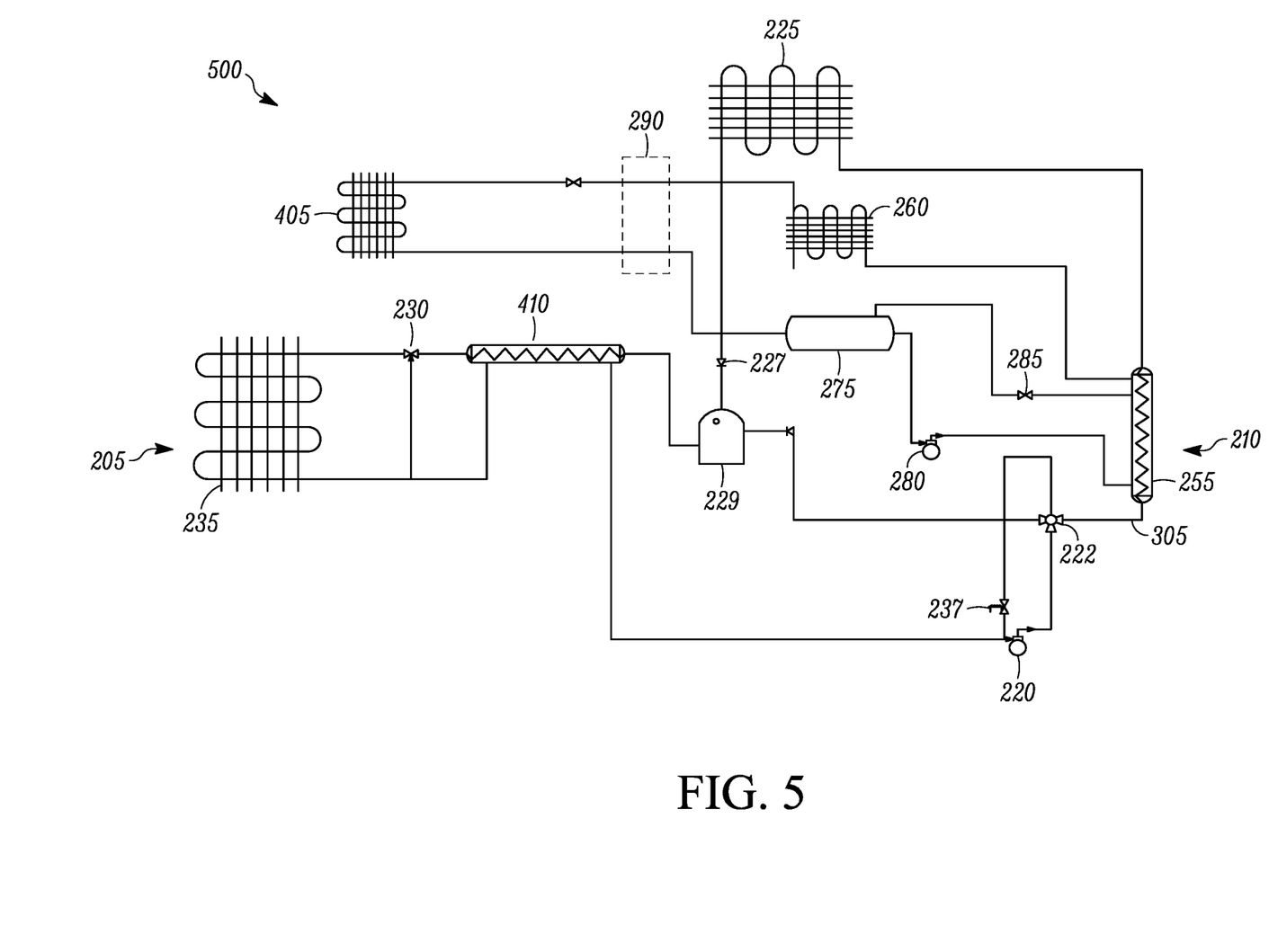
FIG. 5 illustrates a schematic diagram of a TRS including a sorption subsystem without an internal combustion engine, according to some embodiments.

FIG. 5 illustrates a schematic diagram of a TRS 500, according to some embodiments. Aspects of the TRS 500 can be the same as or similar to aspects of the TRS 200 of FIG. 2, the TRS 300 of FIG. 3, and/or the TRS 400 of FIG. 4. Aspects which have previously been described will not be described in additional detail in order to simplify this specification. The TRS 500 can generally be configured to provide heating and/or cooling to an interior space (e.g., the interior space 150 of FIG. 1) of a transport unit (e.g., the transport unit 125 of FIG. 1). The TRS 500 generally includes a refrigeration subsystem 205 and a sorption subsystem 210. The TRS 500 generally does not include an engine system (e.g., the engine system 215 of FIG. 2) in thermal communication with the sorption subsystem 210. It is to be appreciated that the TRS 500 can, for example, include an electric drive motor for providing mechanical power to the compressor 220. In some embodiments, the TRS 500 can include an engine system such as the engine system 215 but that is not configured to be in thermal communication with the sorption subsystem 210. In some embodiments, one or more of the components (e.g., a compressor, one or more fans, one or more blowers, a TRS Controller, one or more flow control devices, etc.) of the TRS 500 can be powered by an electric power source (e.g., a generator, an alternator, a fuel cell, a battery, etc.)

The sorption subsystem 210 is configured such that a refrigerant of the refrigeration subsystem 205 can be a heat source for the sorption subsystem 210. Accordingly, in the TRS 500, a discharge line 305 of the refrigeration subsystem 205 that permits flow of the refrigerant for the refrigeration subsystem 205 from the flow control device 222 to the refrigerant condenser 225 is in thermal communication with the boiler 255 of the sorption subsystem 210. Similar to the TRS 400, the sorption subsystem 210 is not in thermal communication with the refrigeration subsystem 205, but functions as a refrigeration subsystem for at least one of the plurality of zones, while the refrigeration subsystem 205 serves as the refrigeration subsystem for another of the plurality of zones. Accordingly, the sorption subsystem 210 additionally includes an evaporator 405. The evaporator 405 functions similarly to the refrigerant evaporator 235 in the refrigeration subsystem 205. The sorption subsystem 210 of the TRS 500 generally may have a cooling capacity that is different from the refrigeration subsystem 205. Accordingly, the zone which is controlled by the sorption subsystem 210 should be appropriately selected such that the sorption subsystem 210 can meet the cooling requirements for the zone.

The TRS 500 also includes the suction-liquid heat exchanger 410.

Aspects:

It is to be appreciated that any of aspects 1-9 can be combined with any of aspects 10-19, any of aspects 20-22, any of aspects 23-25, aspect 26, and aspect 27. Any of aspects 10-19 can be combined with any of aspects 20-22, any of aspects 23-25, aspect 26, and aspect 27. Any of aspects 20-22 can be combined with any of aspects 23-25, aspect 26, or aspect 27. Further, aspect 26 can be combined with aspect 27.

Aspect 1. A transport refrigeration system (TRS), comprising:
a refrigeration subsystem, the refrigeration subsystem including:
a refrigerant, and a compressor, a refrigerant condenser, a refrigerant expansion device, and a refrigerant evaporator in fluid communication such that the refrigerant can flow therethrough; and
a sorption subsystem, the sorption subsystem including:
a heat transfer fluid,
a heat source, a boiler, a sorption condenser, a sorption expansion valve, a sorption evaporator, and a pump in fluid communication such that the heat transfer fluid can flow therethrough,
wherein the sorption evaporator is in thermal communication with the refrigeration subsystem.

Aspect 2. The TRS according to aspect 1, further comprising:
an engine system, wherein the engine system includes:
an internal combustion engine, a radiator, a coolant line, and an exhaust line,
wherein the coolant line is configured in a closed loop having a coolant from a radiator of the engine system, and the exhaust line is configured such that exhaust from the internal combustion engine flows therethrough.

Aspect 3. The TRS according to aspect 2, wherein one or more of the coolant line and the exhaust line are in thermal communication with the boiler.

Aspect 4. The TRS according to aspect 2, wherein one or more of the coolant line and the exhaust line are the heat source.

Aspect 5. The TRS according to any of aspects 1-4, wherein the thermal communication between the sorption evaporator and the refrigeration subsystem is configured to be disposed at a location in the refrigeration subsystem between the refrigerant condenser and the refrigerant expansion device.

Aspect 6. The TRS according to any of aspects 1-5, wherein the sorption subsystem further includes another sorption heat exchanger.

Aspect 7. The TRS according to aspect 1, wherein the refrigeration subsystem includes a discharge refrigerant line, the discharge refrigerant line configured to provide refrigerant discharged from the compressor to the refrigerant condenser.

Aspect 8. The TRS according to aspect 7, wherein the discharge refrigerant line is in thermal communication with the boiler.

Aspect 9. The TRS according to aspect 8, wherein the discharge refrigerant line is the heat source.

Aspect 10. A transport refrigeration system (TRS) for a transport unit including a plurality of controlled spaces, comprising:
a refrigeration subsystem, the refrigeration subsystem including:
a refrigerant, and
a compressor, a refrigerant condenser, a refrigerant expansion device, and a refrigerant evaporator in fluid communication such that the refrigerant can flow therethrough, and the refrigerant evaporator is in thermal communication with a first of the plurality of conditioned spaces; and
a sorption subsystem, the sorption subsystem including:
a heat transfer fluid,
a heat source, a boiler, a sorption condenser, a sorption expansion valve, a sorption evaporator, and a pump in fluid communication such that the heat transfer fluid can flow therethrough,
wherein the sorption evaporator is in thermal communication with a second of the plurality of controlled spaces.

Aspect 11. The TRS according to aspect 10, further comprising a suction-liquid heat exchanger disposed in the refrigeration subsystem.

Aspect 12. The TRS according to aspect 11, wherein the suction-liquid heat exchanger is disposed between the refrigerant condenser and the refrigerant expansion device.

Aspect 13. The TRS according to any of aspects 10-12, wherein the refrigeration subsystem includes a discharge refrigerant line, the discharge refrigerant line configured to provide refrigerant discharged from the compressor to the refrigerant condenser.

Aspect 14. The TRS according to aspect 13, wherein the discharge refrigerant line is in thermal communication with the boiler.

Aspect 15. The TRS according to aspect 14, wherein the discharge refrigerant line is the heat source.

Aspect 16. The TRS according to any of aspects 10-15, wherein the sorption subsystem further includes another sorption heat exchanger.

Aspect 17. The TRS according to aspect 10, further comprising:
an engine system, wherein the engine system includes:
an internal combustion engine, a radiator, a coolant line, and an exhaust line,
wherein the coolant line is configured in a closed loop having a coolant from a radiator of the engine system, and the exhaust line is configured such that exhaust from the internal combustion engine flows therethrough.

Aspect 18. The TRS according to aspect 17, wherein one or more of the coolant line and the exhaust line are in thermal communication with the boiler.

Aspect 19. The TRS according to aspect 18, wherein one or more of the coolant line and the exhaust line are the heat source.

Aspect 20. A method of subcooling a refrigerant in a refrigeration subsystem of a transport refrigeration system (TRS), comprising:
directing a refrigerant through the refrigeration subsystem;
directing a heat transfer fluid through a sorption subsystem; and transferring heat between the refrigerant of the refrigeration subsystem and the heat transfer fluid of the sorption subsystem.

Aspect 21. The method according to aspect 20, wherein the TRS includes an engine system, the method further comprising heating the heat transfer fluid via one or more of an exhaust line and a coolant line of the engine system.

Aspect 22. The method according to aspect 20, further comprising heating the heat transfer fluid via a discharge line carrying refrigerant discharged from a compressor of the refrigeration subsystem to a condenser of the refrigeration subsystem.

Aspect 23. A method of operating a transport refrigeration system (TRS) in a transport unit including a plurality of controlled spaces, the method comprising:
  directing a refrigerant through a refrigeration subsystem, wherein the a refrigerant evaporator of the refrigeration subsystem is in thermal communication with a first of the plurality of controlled spaces;
  directing a heat transfer fluid through a sorption subsystem; and
  transferring heat between the refrigerant of the refrigeration subsystem and the heat transfer fluid of the sorption subsystem.

Aspect 24. The method according to aspect 23, wherein the TRS includes an engine system, the method further comprising:
  heating the heat transfer fluid via one or more of an exhaust line and a coolant line of the engine system.

Aspect 25. The method according to aspect 23, further comprising: heating the heat transfer fluid via a discharge line carrying refrigerant discharged from a compressor of the refrigeration subsystem to a refrigerant condenser of the refrigeration subsystem.

Aspect 26. A refrigeration system, comprising:
  a refrigerant;
  a compressor;
  a refrigerant condenser;
  a refrigerant expansion device; and
  a refrigerant evaporator, wherein the compressor, the refrigerant condenser, the refrigerant expansion device, and the refrigerant evaporator are in fluid communication such that the refrigerant can flow therethrough, and
  the refrigeration system is configured to be in thermal communication with a sorption subsystem separate from the refrigeration system.

Aspect 27. A sorption system, comprising:
  a heat transfer fluid,
  a heat source;
  a boiler;
  a sorption condenser;
  a sorption expansion valve;
  a sorption evaporator; and
  a pump, wherein the heat source, the boiler, the sorption condenser, the sorption expansion valve, and the sorption evaporator are in fluid communication such that the heat transfer fluid can flow therethrough, and
  wherein the sorption system is in thermal communication with a refrigeration system separate from the sorption system.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this specification may, but does not necessarily, refer to the same embodiment. This specification and the embodiments described are exemplary only. Other and further embodiments may be devised without departing from the basic scope thereof, with the true scope and spirit of the disclosure being indicated by the claims that follow.

What is claimed is:

1. A transport refrigeration system (TRS), comprising:
  a refrigeration subsystem, the refrigeration subsystem including:
    a refrigerant, and
    a compressor, a refrigerant condenser, a refrigerant expansion valve, and a refrigerant evaporator in fluid communication such that the refrigerant can flow therethrough; and
  a sorption subsystem, the sorption subsystem including:
    a heat transfer fluid,
    a heat source, a boiler, a sorption condenser, a sorption expansion valve, a sorption evaporator, an absorber, and a pump in fluid communication such that the heat transfer fluid can flow therethrough,
  wherein the refrigerant of the refrigeration subsystem and the heat transfer fluid of the sorption subsystem are in thermal communication,
  wherein the sorption evaporator is in thermal communication with the refrigeration subsystem, and
  wherein the thermal communication between the sorption evaporator and the refrigeration subsystem is configured to be disposed at a location in the refrigeration subsystem between the refrigerant condenser and the refrigerant expansion valve in a heating mode and in a cooling mode.

2. The TRS according to claim 1, further comprising:
  an engine system, wherein the engine system includes:
    an internal combustion engine, a radiator, a coolant line, and an exhaust line,
  wherein the coolant line is configured in a closed loop having a coolant from a radiator of the engine system, and the exhaust line is configured such that exhaust from the internal combustion engine flows therethrough.

3. The TRS according to claim 2, wherein one or more of the coolant line and the exhaust line are in thermal communication with the boiler and one or more of the coolant line and the exhaust line are the heat source.

4. The TRS according to claim 1, wherein the refrigeration subsystem includes a discharge refrigerant line, the discharge refrigerant line configured to provide refrigerant discharged from the compressor to the refrigerant condenser, the discharge refrigerant line being in thermal communication with the boiler, the discharge refrigerant line being the heat source.

5. The TRS according to claim 1, wherein the absorber separates a liquid portion of the heat transfer fluid from a gaseous portion of the heat transfer fluid, the gaseous portion being provided downstream of the boiler and the liquid portion being provided to the boiler via the pump.

6. A transport refrigeration system (TRS), comprising:
a refrigeration subsystem, the refrigeration subsystem including:
  a refrigerant, and
  a compressor, a refrigerant condenser, a refrigerant expansion valve, and a refrigerant evaporator in fluid communication such that the refrigerant can flow therethrough; and
a sorption subsystem, the sorption subsystem including:
  a heat transfer fluid,
  a heat source, a boiler, a sorption condenser, a sorption expansion valve, a sorption evaporator, an absorber, and a pump in fluid communication such that the heat transfer fluid can flow therethrough,
wherein the refrigerant of the refrigeration subsystem and the heat transfer fluid of the sorption subsystem are in thermal communication,
wherein the TRS is for a transport unit that includes a plurality of controlled spaces, the refrigerant evaporator is in thermal communication with a first of the plurality of controlled spaces; and
the sorption evaporator is in thermal communication with a second of the plurality of controlled spaces.

7. The TRS according to claim 6, further comprising a suction-liquid heat exchanger disposed between the refrigerant condenser and the refrigerant expansion valve in the refrigeration subsystem.

8. The TRS according to claim 6, wherein the refrigeration subsystem includes a discharge refrigerant line, the discharge refrigerant line configured to provide refrigerant discharged from the compressor to the refrigerant condenser, the discharge refrigerant line being in thermal communication with the boiler.

9. The TRS according to claim 6, further comprising:
an engine system, wherein the engine system includes:
  an internal combustion engine, a radiator, a coolant line, and an exhaust line,
  wherein the coolant line is configured in a closed loop having a coolant from a radiator of the engine system, and the exhaust line is configured such that exhaust from the internal combustion engine flows therethrough.

10. The TRS according to claim 6, wherein the absorber separates a liquid portion of the heat transfer fluid from a gaseous portion of the heat transfer fluid, the gaseous portion being provided downstream of the boiler and the liquid portion being provided to the boiler via the pump.

11. A method of operating a transport refrigeration system (TRS) in a transport unit including a plurality of controlled spaces, the method comprising:
directing a refrigerant through a refrigeration subsystem, wherein a refrigerant evaporator of the refrigeration subsystem is in thermal communication with a first of the plurality of controlled spaces;
directing a heat transfer fluid through a sorption subsystem including a heat source, a boiler, a sorption condenser, a sorption expansion valve, a sorption evaporator, an absorber, and a pump in fluid communication such that the heat transfer fluid flows therethrough; and
transferring heat between the refrigerant of the refrigeration subsystem and the heat transfer fluid of the sorption subsystem.

12. The method according to claim 11, wherein the TRS includes an engine system, the method further comprising one or more of:
heating the heat transfer fluid via one or more of an exhaust line and a coolant line of the engine system; and
heating the heat transfer fluid via a discharge line carrying refrigerant discharged from a compressor of the refrigeration subsystem to a refrigerant condenser of the refrigeration subsystem.

* * * * *